(12) United States Patent
Denley

(10) Patent No.: US 6,338,567 B1
(45) Date of Patent: Jan. 15, 2002

(54) GEARLESS HEADLAMP ADJUSTOR

(75) Inventor: Ronald S. Denley, Woodstock, IL (US)

(73) Assignee: Elco Textron Inc., Rockford, IL (US)

( * ) Notice: Subject to any disclaimer, the term of this patent is extended or adjusted under 35 U.S.C. 154(b) by 0 days.

(21) Appl. No.: 09/503,366

(22) Filed: Feb. 14, 2000

Related U.S. Application Data

(60) Provisional application No. 60/123,034, filed on Mar. 4, 1999.

(51) Int. Cl.$^7$ ............................................. F21V 7/00
(52) U.S. Cl. ..................... 362/515; 362/514; 362/529; 362/284
(58) Field of Search ......................... 362/514, 515, 362/524, 529, 530, 531, 532, 284, 273

(56) References Cited

U.S. PATENT DOCUMENTS

| | | |
|---|---|---|
| 4,674,018 A | 6/1987 | Ryder et al. ................. 362/424 |
| 4,709,306 A * | 11/1987 | Harris et al. ................. 362/530 |
| 4,802,067 A | 1/1989 | Ryder et al. |
| 4,809,139 A | 2/1989 | Ryder et al. |
| 4,922,387 A | 5/1990 | Ryder et al. |
| 5,077,642 A | 12/1991 | Lisak |
| 5,079,676 A | 1/1992 | Lisak |
| 5,140,503 A | 8/1992 | Lisak |
| 5,161,877 A | 11/1992 | Wright et al. |
| 5,163,746 A | 11/1992 | Lisak |
| 5,165,775 A | 11/1992 | Lisak et al. |
| 5,186,531 A | 2/1993 | Ryder et al. |
| 5,186,532 A | 2/1993 | Ryder et al. |
| 5,285,360 A | 2/1994 | Kanner |
| 5,309,780 A | 5/1994 | Schmitt |
| 5,365,415 A | 11/1994 | Schmitt et al. |
| 5,381,317 A | 1/1995 | Schmitt et al. |
| 5,544,023 A | 8/1996 | Schmitt et al. |
| 5,586,393 A | 12/1996 | Pherigo et al. |
| 5,673,992 A | 10/1997 | Schmitt |
| 5,697,161 A | 12/1997 | Denley |
| 5,735,656 A | 4/1998 | Marvell et al. |
| 5,746,000 A | 5/1998 | Schmitt |
| 5,752,321 A | 5/1998 | Schmitt et al. |
| 5,778,544 A | 7/1998 | Pherigo |
| 5,897,202 A | 4/1999 | Denley |
| 5,951,157 A * | 9/1999 | Shirai et al. ................. 362/529 |

\* cited by examiner

Primary Examiner—Stephen Husar
(74) Attorney, Agent, or Firm—Trexler, Bushnell, Giangiorgi, Blackstone & Marr, Ltd.

(57) ABSTRACT

A device for adjusting the position of a headlamp reflector of a headlamp assembly. The device includes a housing and a directing member, such as an adjustor screw, which generally extends from the housing. The directing member has an end which is engageable with the headlamp reflector of the headlamp assembly, and an opposite end which is configured to receive a driver generally coaxial with a longitudinal axis of the directing member. The directing member provides that rotation of the driver about an axis which is generally coaxial with the longitudinal axis of the directing member causes the directing member to translate relative to the housing thereby causing adjustment of the position of the headlamp reflector which is engaged with the first end of the directing member. By providing that the direction member is configured to receive a driver generally coaxial with a longitudinal axis of the directing member, the device need not include gearing in order to transfer rotation at 90 degrees or greater to the directing member. The device can be gearless, provide adjustment input at 90 degrees or greater from the directing member, and therefore can be produced at relatively low cost.

40 Claims, 5 Drawing Sheets

GEARLESS HEADLAMP ADJUSTOR

RELATED APPLICATION

This application claims the benefit of U.S. Provisional Application Ser. No. 60/123,034, filed Mar. 4, 1999.

BACKGROUND OF THE INVENTION

The present invention relates generally to devices for adjusting the aiming of automotive headlamps, and relates more specifically to a gearless device for adjusting the position of an automotive headlamp reflector of an automotive headlamp assembly from an input position 90 degrees of greater to the axis of the light beam.

Modern day headlamps for vehicles have been engineered and designed to be aerodynamically efficient. In this regard, the headlamps are designed as sealed assemblies wherein the portion of the headlamp approximate the outer surface of the automobile is relatively stationary, and is aerodynamic. A headlamp assembly normally includes: a fixed housing, to which an outer headlamp lens is affixed; a movable reflector, which is mounted within the fixed housing; and a stationary headlamp bulb, which is positioned within the movable reflector. Typically, the movable reflector is mounted to the housing by a universal or ball-type pivot which is stationary, or fixed, on the housing.

A first pivot point is generally disposed vertical of the fixed pivot, and a second pivot point is generally disposed horizontal of the fixed pivot. As such, the movable reflector may be pivoted about the fixed pivot in the vertical and horizontal planes to aim the headlamp beam. Adjustor mechanisms are typically provided at the first and second pivot points, normally termed the vertical pivot and the horizontal pivot, and the adjustor mechanisms can be operated to effect movement of the reflector in the vertical and horizontal planes.

The adjustor mechanisms are typically mounted to the housing of the headlamp assembly and have adjustor screws operatively connected to the movable reflector by ball and socket type pivots, or the like, Such that linear movement of the adjustor screws produces pivoting of the movable reflector in the vertical and horizontal planes. Specifically, each adjustor mechanism typically includes drive structure for receiving a tool, and typically the drive structure is geared, such as at a right angle, to the adjustor screw. The gearing provides that using the tool to rotate the tool-receiving structure causes linear translation of the adjustor screw and therefore adjustment of the position of the headlamp reflector. Unfortunately, by requiring gearing, the adjustor mechanisms are not generally low cost.

The Department of Transportation of the United States government has set forth specific guidelines dealing with vehicle headlamp adjustor mechanisms in both the horizontal and vertical directions. These guidelines have been issued under regulation FMVSS108, and they set forth the accuracy which is required of headlamp adjustor mechanisms.

In addition to setting forth the required accuracy, the guidelines also provide that the headlamp adjustor mechanisms must be generally tamper-resistant. Before an automobile is released to the consumer, the movable reflectors of the headlamp assemblies are adjusted, typically at the automobile assembly plant, to a desired position so that the headlamp beams are properly aimed in both the vertical and horizontal directions. The government guidelines generally provide that the headlamp adjustor mechanisms must be configured such that they require that, after a vehicle is released from the factory, any subsequent adjustments to the headlamp assemblies using the adjustor mechanisms must be preformed by an authorized person, such as by a mechanic.

To provide that the headlamps of an automobile do not readily change aim as a result of, for example, vibrations which occur during driving, it is imperative that the headlamp adjustor mechanisms which arc engaged with the headlamp reflectors do not readily change position. More specifically, it is imperative that the headlamp adjustor mechanisms provide that the adjustor screws are subjected to a prevailing torque which keeps the adjustor screws from readily translating or moving out of position in response to vibrations, thereby causing an unintended shift in the aiming of the headlamp.

Many headlamp adjustor mechanisms which are available provide the necessary prevailing torque by providing an interference fit between the adjustor screw and a housing of the mechanism. Many headlamp adjustor mechanisms also employ a thread sealing compound between the adjustor screw and the housing to enhance the interference fit. Regardless of whether a thread scaling compound is utilized, relying on an interference fit between the adjustor screw and the housing to provide the necessary prevailing torque provides that the torque does not generally remain consistent, and instead generally declines with each movement of the adjustor screw relative to the housing. This provides that the headlamp adjustor mechanisms become less reliable with each adjustment.

OBJECTS AND SUMMARY

Accordingly, it is an object of the present invention to provide a gearless device for adjusting the position of a headlamp reflector.

Another object of the present invention is to provide a generally tamper-resistant device for adjusting the position of a headlamp reflector.

Still another object of the present invention is to provide a device for adjusting the position of a headlamp reflector, where the device provides generally consistent prevailing torque, and does not tend to become less reliable with each adjustment.

Briefly, and in accordance with one or more of the foregoing objects, the present invention provides a device for adjusting the position of a headlamp reflector of a headlamp assembly. The device includes a housing and a directing member, such as an adjustor screw, which generally extends from the housing. The directing member has a first end which is engageable with the headlamp reflector of the headlamp assembly. A second end of the directing member, which is opposite the first end thereof, is configured to receive a driver generally coaxial with a longitudinal axis of the directing member. The directing member provides that rotation of the driver about an axis which is generally coaxial with the longitudinal axis of the directing member causes the directing member to translate relative to the housing thereby causing adjustment of the position of the headlamp reflector which is engaged with the first end of the directing member.

By providing that the directing member is configured to receive a driver generally coaxial with a longitudinal axis of the directing member, the device need not include gearing in order to transfer rotation of a drive tool into translation of the directing member and adjustment of the headlamp reflector. In other words, a device which is configured in accordance with the present invention can be gearless, and therefore can be produced at relatively low cost.

In one embodiment of the present invention, a guide is provided on the housing for receiving and guiding the driver to the second end of the directing member. It is preferred that the guide be configured such that the guide generally hides the second end of the directing member from view thereby making it somewhat difficult for a consumer to predict which type of tool is needed to effect translation of the directing member and effect an adjustment to the position of the headlamp reflector. Preferably, the guide is configured such that a custom adjustment tool, such as a tool with a flexible shaft with the driver at an end of the flexible shaft, needs to be used to engage the second end of the directing member and adjust the position of the headlamp reflector.

By providing that it is relatively difficult to ascertain what type of adjustment tool is needed to effect translation of the directing member, and by requiring that a custom adjustment tool must be used to adjust the headlamp reflector, the device is generally tamper-resistant with respect to a typical consumer.

In another embodiment of the present invention, a guide is provided on the housing for receiving and guiding the driver to the second end of the directing member, and the guide and housing are configured such that the guide is rotatable with respect to the housing. Preferably, the guide is rotatable to a position which provides that it is somewhat difficult to insert the driver into the guide to effect translation of the directing member (i.e. the guide can be rotated to a disabling position). Preferably, the guide and housing are configured such that the guide can be reasonably locked in the disabling position. It is preferred that the guide be configured such that the guide generally hides the second end of the directing member from view thereby making it somewhat difficult for a consumer to predict which type of tool is needed to effect translation of the directing member and effect an adjustment to the position of the headlamp reflector. Preferably, the guide is configured such that a custom adjustment tool, such as a tool with a flexible shaft with the driver at an end of the flexible shaft, needs to be used to engage the second end of the directing member and adjust the position of the headlamp reflector.

By providing that the guide can be rotated and locked in a disabling position, that it is relatively difficult to ascertain what type of adjustment tool is needed to effect translation of the directing member, and that a custom adjustment tool must be used to adjust the position of the headlamp reflector, the device is generally tamper-resistant with respect to a typical consumer.

Preferably, the rotatability of the guide also provides that when the guide is not locked into the disabling position, the guide can be rotated to a position which makes it relatively easy for an authorized person to insert the driver into the guide and effect an adjustment to the directing member, and therefore adjust the position of the headlamp reflector.

In a preferred embodiment of the present invention, a guide is provided on the housing for receiving and guiding the driver to the second end of the directing member, and the guide consists of a guide tube which is engaged with a guide adapter on an end of the housing. Preferably, the guide is configured such that the guide generally hides the second end of the directing member from view thereby making it somewhat difficult for a consumer to predict which type of tool is needed to effect translation of the directing member and effect an adjustment to the position of the headlamp. It is preferred that the guide be configured such that a custom adjustment tool, such as a tool with a flexible shaft with the driver at an end of the flexible shaft, needs to be used to engage the second end of the directing member and adjust the position of the headlamp reflector.

By providing that it is relatively difficult to ascertain what type of adjustment tool is needed to effect translation of the directing member, and by requiring that a custom adjustment tool must be used to adjust the position of the headlamp reflector, the device is generally tamper-resistant with respect to a typical consumer.

A device which is configured in accordance with the present invention preferably also includes means for providing a prevailing torque on the directing member. Specifically, the prevailing torque providing means may provide that a cover of the housing includes a spring yoke which engages and deflects a torque block in the housing toward the directing member. The torque block is deflected toward the directing member to provide a generally consistent prevailing torque on the directing member. As a result, the device does not tend to become less reliable with each adjustment. Of course, other means for providing a prevailing torque may be utilized in connection with the present invention.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION OF EMBODIMENTS OF THE INVENTION

Figure 1:
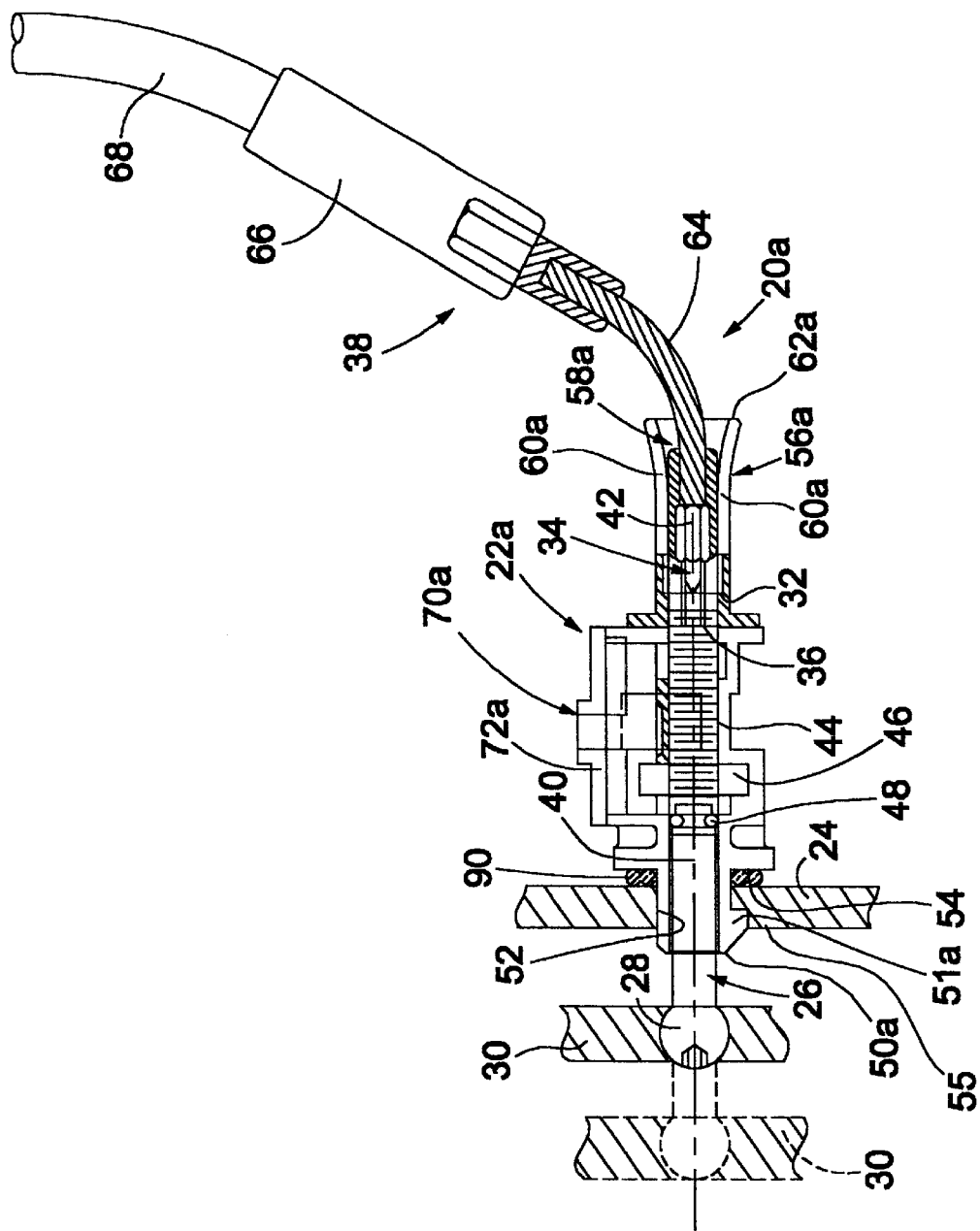
FIG. 1 is a side elevational view, partially in section, of a device in accordance with a first embodiment of the present invention, showing an adjustment tool engaged with a directing member of the device to effect adjustment of a headlamp reflector which is engaged with the directing member.

While the present invention may be susceptible to embodiment in different forms, there is shown in the drawings, and herein will be described in detail, embodiments of the invention with the understanding that the present description is to be considered an exemplification of the principles of the invention and is not intended to limit the invention to that as illustrated and described herein.

Figure 5:
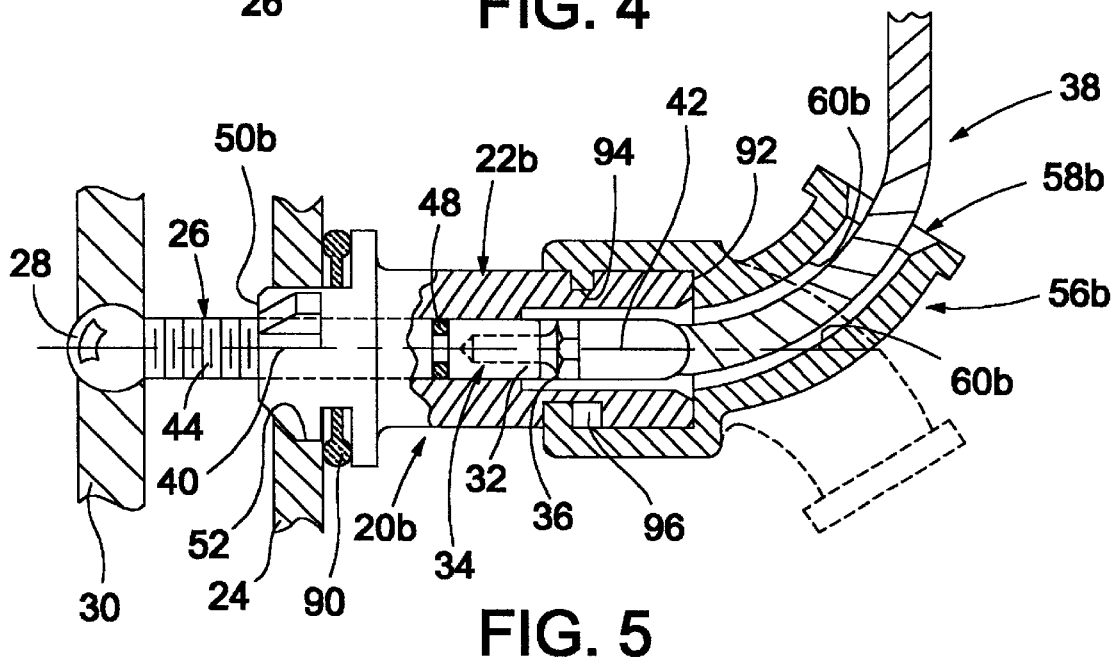
FIG. 5 is a side elevational view, partially in section, of a device in accordance with a second embodiment of the present invention, showing an adjustment tool received by a guide of the device and engaged with a directing member of the device to effect adjustment of a headlamp reflector engaged with the directing member, FIG. 5 also shows, in phantom, the guide after it has been rotated into a disabling position.
Figure 7:
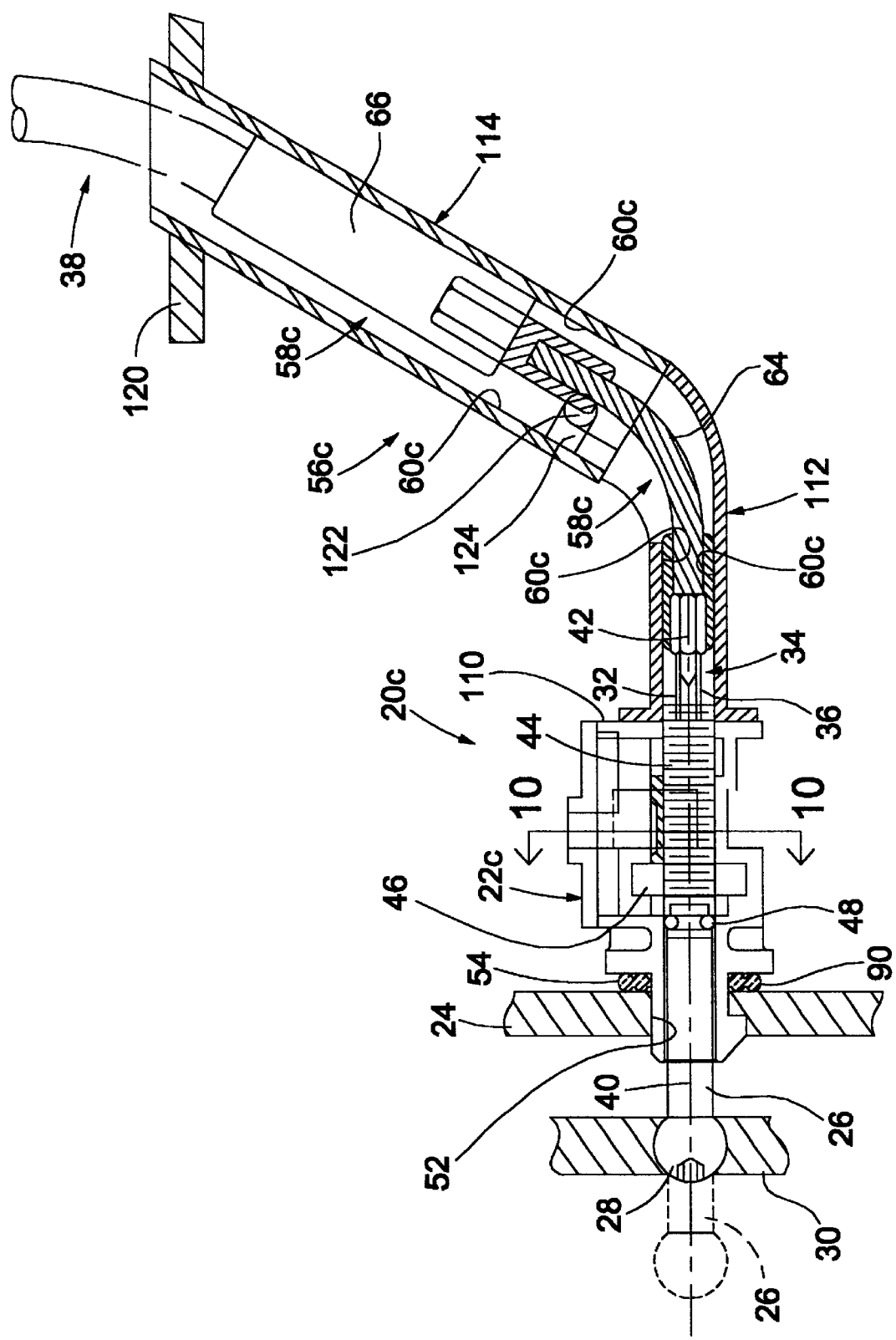
FIG. 7 is a side elevational view, partially in section, of a device in accordance with a third and preferred embodiment of the present invention, showing an adjustment tool received by a guide of the device and engaged with a directing member of the device to effect adjustment of a headlamp reflector which is engaged with the directing member.

Specifically, a first embodiment of the present invention is illustrated in FIG. 1, a second embodiment of the present invention is illustrated in FIG. 5, and a third and preferred embodiment of the present invention is illustrated in FIG. 7. As will be described more fully later herein, each of the embodiments provides a device for adjusting the position of a headlamp reflector of a headlamp assembly, and each includes a directing member which is configured to receive a driver generally coaxial with a longitudinal axis of the directing member. The directing member provides that rotation of the driver in a direction which is generally coaxial with the longitudinal axis of the directing member causes the directing member to translate and cause an adjustment to the position of a headlamp reflector engaged with the directing member. By providing that the directing member is configured to receive a driver generally coaxial with a longitudinal axis of the directing member, none of the embodiments illustrated in FIGS. 1, 5 and 7 need to include gearing in order to transfer rotation of the driver into translation of the directing member, which translation in turn effects an adjustment of the position of the headlamp reflector. In other words, each of the embodiments illustrated in FIGS. 1, 5 and 7 can be gearless. Therefore, each can be produced at relatively low cost.

Each of the embodiments will be described in detail using like reference numerals to identify like components. At times, a detailed description of a component is omitted with the understanding that one can review the discussion of the corresponding component of at least one of the other embodiments to gain a further understanding thereof.

FIG. 1 illustrates a device 20a which is in accordance with a first embodiment of the present invention. The device 20a includes a housing 22a which is engageable with support structure 24 such as a headlamp assembly. Alternatively, one skilled in the art would recognize that the housing of the device may be configured for mounting to other fixed surfaces such as to a vehicle frame or the like without departing from the invention.

The device 20a also includes a directing member 26, such as an adjustor screw or ball screw, which extends from the housing 22a and has a first end 28 which is engageable with a headlamp reflector 30 of the headlamp assembly. The first end 28 of the directing member 26 may provide a generally spherical portion, as is readily known in the art, for engaging in a corresponding socket on the headlamp reflector 30 such that the end 28 of the directing member 26 can pivot in the socket upon linear translation (represented in FIG. 1 by the difference between the position of the directing member 26 indicated with real lines and the position of the directing member 26 indicated in phantom) relative to the housing 22a.

The directing member 26 has a second end 32 which is opposite the first end 28, and the second end 32 is preferably configured to receive a drive 34, such as an end 36 of a tool 38 for driving rotation of the directing member 26. Specifically, the second end 32 of the directing member 26 may have a recess formed therein for receiving, for example, a multi-lobular driver such as a Torx® bit, or another suitably configured driver. Preferably, the second end 32 of the directing member 26 is configured Such that it receives the driver 34 generally coaxial with a longitudinal axis 40 of the directing member 26. The directing member 26 preferably provides that rotation of the driver 34 about an axis 42 which is generally coaxial with the longitudinal axis 40 of the directing member 26 causes the directing member 26 to translate linearly relative to the housing 22a thereby causing an adjustment to the position of the headlamp reflector 30 which is engaged with the first end 28 of the directing member 26.

By providing that the directing member 26 is configured to receive the driver 34 generally coaxial with a longitudinal axis 40 of the directing member 26, the device 20a need not include gearing in order to transfer rotation of the driver 34 into linear translation of the directing member 26, which translation in turn effects an adjustment of the position of the headlamp reflector 30. In other words, the device 20a can be gearless, and therefore can be produced at relatively low cost.

As discussed, rotation of the directing member 26 causes the directing member 26 to translate relative to the housing 22a. Specifically, as shown in FIG. 1, threading 44 may be provided on the directing member 26 for engaging a hex nut 46 which is non-rotatably retained in the housing 22a. Of course, other structure may be provided to cause the directing member 26 to translate relative to the housing 22a upon rotation of the directing member 26.

As shown in FIG. 1, scaling structure 48 may be provided between the housing 22a and the directing member 26 to generally prevent moisture from entering the housing 22a. For example, the sealing structure 48 may consist of a rubber o-ring which is retained on a recess of the directing member 26 and which engages the housing 22a.

As discussed above, the housing 22a may be configured to engage the headlamp assembly 24. More specifically, the housing 22a is preferably configured to engage the headlamp assembly 24 by inserting the end 50a of the housing 22a into an aperture 52 in the headlamp assembly 24, and rotating the housing 22a one third turn to lock the housing 22a in place relative to the headlamp assembly 24 (i.e. preferably the device 20a is "third turn" mounted and is "quick connect" mounted, or the device 20a may be "quarter turn" mounted). An elastomeric sealing structure 90 may be provided to serve a two-fold purpose: 1. to provide an axial force between housing tabs 51a and headlamp assembly radial detent 55 for structural retention; and 2. To generally prevent moisture from entering the headlamp assembly 24 through the aperture 52 in the headlamp assembly 24.

Proximate the second end 32 of the directing member 26 is a guide 56a which is on the housing 22a. The guide 56a may be a separate part which is mounted on the housing 22a, or may actually be a portion of the housing 22a itself. Regardless, the guide 56a provides a receptacle 58a for receiving the driver 34. As the driver 34 is initially inserted in the receptacle 58a, preferably internal walls 60a of the guide 56a work to guide the driver 34 to the second end 32 of the directing member 26. This provides that an authorized person attempting to effect an adjustment to the position of the headlamp reflector 30 can do so "blindly" merely by inserting the end 36 of a drive tool 38 into the receptacle 58a provided by the guide 56a. As the driver 34 reaches the second end 32 of the directing member 26, the driver 34 may be pulsed to provide alignment with respect to the second end 32 of the directing member 26 for engagement therewith. After engagement, the driver 34 can be rotated to effect an adjustment to the position of the headlamp reflector 30.

As shown in FIG. 1, the internal walls 60a of the guide 56a may be generally parallel along a length of the walls 60a and then may flare away from each other at an end 62a of the guide to provide a larger opening for initially receiving the driver into the receptacle 58a. Of course, other configurations of the guide 56a may be employed. In fact, a couple other possible configurations are depicted in FIGS. 5 and 7 in connection with the other two embodiments of the present invention which are described later herein. Regardless, it is preferred that the guide 56a be configured such that the guide 56a generally hides the second end 32 of the directing member 26 from view thereby making it somewhat difficult for a consumer to predict which type of tool is needed to effect translation of the directing member 26 and an adjustment to the position of the headlamp reflector 30.

Figure 2:
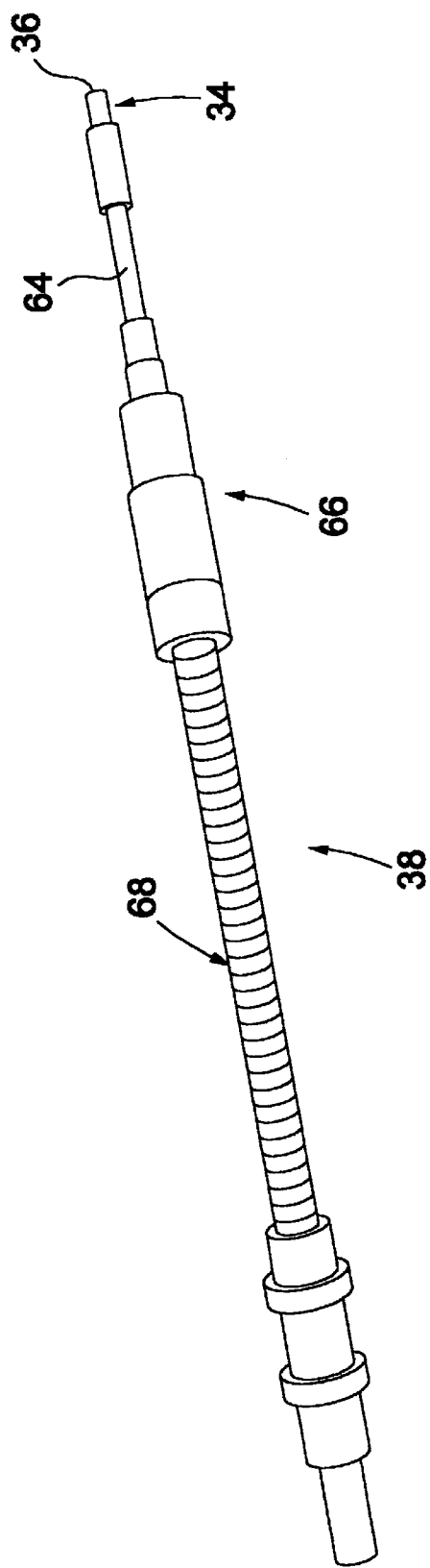
FIG. 2 is a perspective view of an adjustment tool, a portion of which is shown in FIG. 1.
Figure 3:
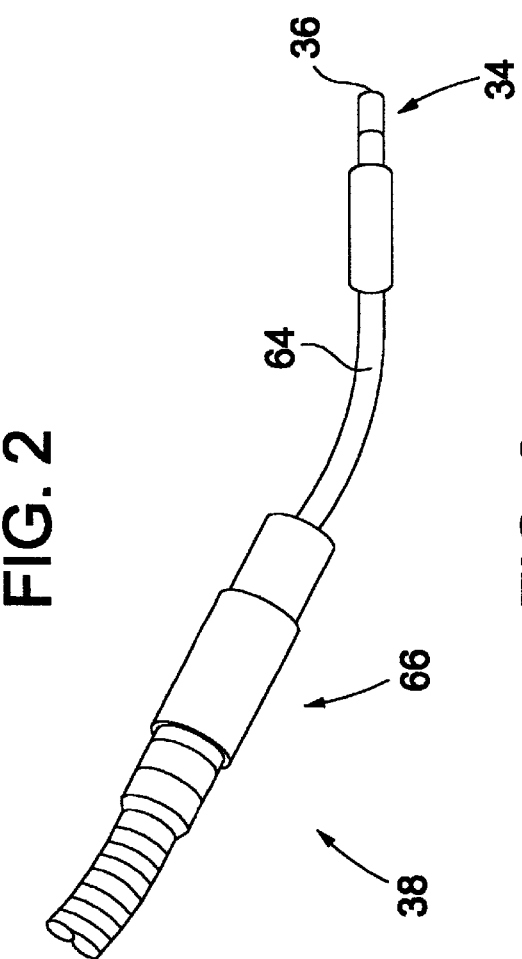
FIG. 3 is a perspective view of a portion of the adjustment tool illustrated in FIG. 2, showing flexing of a flexible shaft of the tool.

The second end 32 of the directing member 26 and the guide 56a on the housing 22a may be configured such that a custom adjustment tool 38 as shown in FIGS. 1–3 must be used to drive translation of the directing member 26 and effect an adjustment to the headlamp reflector 30. As shown in FIGS. 1–3, the tool 38 includes a flexible shaft 64 which has the driver 34 at an end 36 of the flexible shaft 64. As discussed above, the driver 34 may be multi-lobular such as a Torx® driver. The flexible shaft 64 has more flex for easier access while maintaining torque capacity and is coupled with a less flexible but longer flexible driver 68 that would be coupled to the factory power driver.

The configuration of the guide 56a on the housing 22a and the flexibility of the more robust flexible shaft 68 and the flexible shaft 64 of the tool 38 provides that the driver 34 can be relatively easily manipulated into the receptacle 58a in the guide 56a and engaged with the second end 32 of the directing member 26, as illustrated in FIG. 1, to drive translation of the directing member 26 relative to the housing 22a and effect an adjustment to the position of the headlamp reflector 30. As discussed above, after the driver 34 reaches the second end 32 of the directing member 26, the driver 34 may be pulsed to provide alignment with respect to the second end 32 of the directing member 26 for engagement therewith. Subsequently, the positioning of the headlamp reflector 30 can be adjusted using the tool 38.

By providing that it is relatively difficult to ascertain what type of adjustment tool is needed to effect translation of the directing member 26, and by requiring that a custom adjustment tool 38 must be used to adjust the headlamp reflector 30, the device 20a is generally tamper-resistant with respect to a typical consumer. In other words, a typical consumer generally cannot readily use the device 20a to adjust the headlamp reflector 30.

Figure 4:
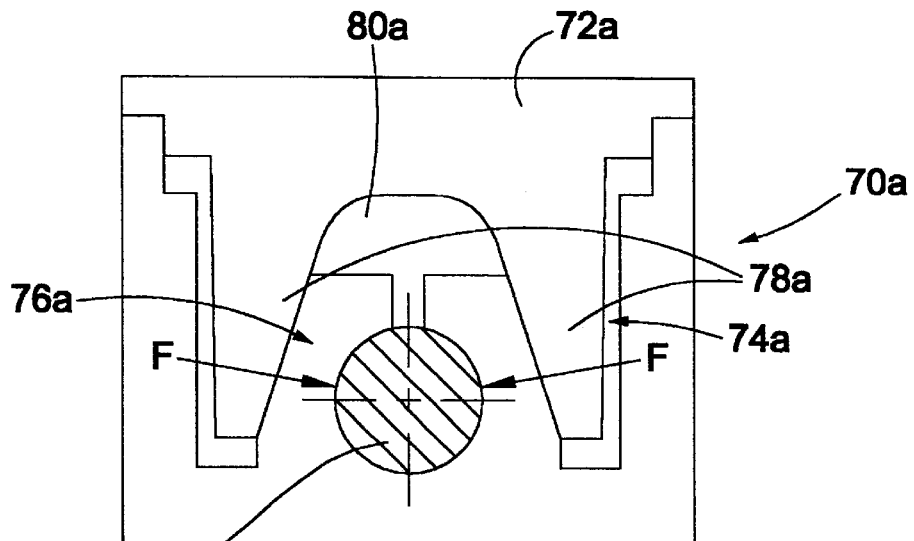
FIG. 4 is a cross-sectional view, taken along line 4—4 of FIG. 1, of the device illustrated in FIG. 1, showing structure for providing a prevailing torque.

Preferably, as shown in FIGS. 1 and 4, the device 20a also includes means 70a for providing a prevailing torque. Specifically, as shown in FIG. 4, a cover 72a of the housing 22a may include a spring yoke 74a which engages and deflects a torque block 76a in the housing 22a toward the directing member 26. The torque block 76a is deflected toward the directing member 26 to provide a prevailing torque on the directing member 26. The prevailing torque generally prevents the directing member 26 from readily translating without engagement with the driver 34. As a result, the prevailing torque generally prevents the headlamp reflector 30 from unintentionally moving out of position, for example, in response to vibrations which result from driving the vehicle in which the headlamp assembly is incorporated.

As shown in FIG. 4, the torque block 76a may consist of a split inner housing which provides two arms 78a separated by a gap 80a. The deflection of the torque block 76a, and specifically the arms 78a, by the spring yoke 74a, toward the directing member 26 causes the torque block 76a to exert hoop forces (represented in FIG. 4 by two "F's" and associated arrows) on the directing member 26 by an interference fit between the housing 22a and the directing member 26, and the elastic forces generated as gap 80a is decreased. The elastic forces are produced by the difference between the material yield in the housing 22a and the greater forces caused by the material yield in the spring yoke after the cover 72a is sonic welded into place with respect to the housing 22a. Preferably, the directing member 26 is inserted in the torque block 76a before the cover 72a is welded into place.

The prevailing torque on the directing member 26 is generated by the hoop forces and by the coefficient of friction between the directing member 26 and the housing 22a. Torque change then becomes a function of two spring forces rather than an interference fit as in prior art headlamp adjustor mechanisms. As a result, the prevailing torque providing means 70a provides a generally consistent prevailing torque which does not tend to generally decrease with each movement of the directing member 26 relative to the housing 22a. Therefore, the device 20a does not tend to become less reliable with each adjustment. Of course, other prevailing torque providing means may be utilized in connection with the present invention.

FIG. 5 illustrates a device 20b which is in accordance with a second embodiment of the present invention. Like the device 20a illustrated in FIG. 1, the device 20b illustrated in FIG. 5 includes a housing 22b which is engageable with a headlamp assembly 24 or to some other suitable fixed surface, and a directing member 26, such as an adjustor screw or ball screw, which extends from the housing 22b and has a first end 28 which is engageable with a headlamp reflector of the headlamp assembly.

Like the directing member 26 of the device illustrated in FIG. 1, the directing member 26 of the device illustrated in FIG. 5 has a second end 32 opposite the first end 28 which is preferably configured to receive a driver 34, such as a multi-lobular driver, e.g. a Torx® bit, or another suitably configured driver 34, and is configured such that it receives the driver 34 generally coaxial with a longitudinal axis 40 of the directing member. Rotation of the driver 34 about an axis 42 which is generally coaxial with the longitudinal axis 40 of the directing member 26 causes the directing member 26 to translate linearly relative to the housing 22b thereby causing an adjustment to the position of the headlamp reflector 30 which is engaged with the first end 28 of the directing member 26. As shown in FIG. 5, threading 44 may be provided on the directing member for engaging a hex nut (not specifically shown in FIG. 5) which is non-rotatably retained in the housing 22b. Of course, other structure may be provided to cause the directing member 26 to translate relative to the housing 22b upon rotation of the directing member 26.

As with the device 20a illustrated in FIG. 1, by providing that the directing member 26 is configured to receive the driver 34 generally coaxial with a longitudinal axis 40 of the directing member 26, the device 20b illustrated in FIG. 5 need not include gearing in order to transfer rotation of the driver 34 into linear translation of the directing member 26, which translation in turn effects an adjustment of the position of the headlamp reflector 30. In other words, the device 20b can be gearless, and therefore can be produced at relatively low cost.

Sealing structure 48 may be provided between the housing 22b and the directing member 26 to generally prevent moisture from entering the housing 22b. Additionally, sealing structure 90 may be provided between the headlamp assembly 24 and the housing 22b to provide structural retention and seal out moisture as explained hereinabove. For example, the sealing structures 48 and 90 may consist of rubber or silicone o-rings.

Preferably, the housing 22b is configured to engage the headlamp assembly 24 by inserting the end 50b of the housing 22b into an aperture 52 in the headlamp assembly 24, and rotating the housing 22b one third turn to lock the housing 22b in place relative to the headlamp assembly 24 (i.e. preferably the device 20b is "quick connect" mounted).

Proximate the second end 32 of the directing member 26 is a guide 56b which is engaged with an end 92 of the housing 22b. The guide 56b provides a receptacle 58b for receiving the driver 34. As the driver 34 is initially inserted in the receptacle 58b, preferably internal walls 60b of the guide 56b work to guide the driver 34 to the second end 32 of the directing member 26. This provides that an authorized person attempting to effect an adjustment to the position of the headlamp reflector 30 can do so "blindly" merely by inserting the end 36 of a drive tool 38 into the receptacle 58b provided by the guide 56b. As the driver 34 reaches the second end 32 of the directing member 26, the driver 34 may be pulsed to provide alignment with respect to the second end 32 of the directing member 26 for engagement therewith. Subsequently, the tool 38 can be used to adjust the headlamp reflector 30.

The guide 56b and housing 22b are preferably configured such that the guide 56b is rotatable with respect to the housing 22b so that the guide 56b can be rotated to a position at which it is generally difficult or impossible to insert the driver 34 into the guide 56b (i.e. a disabling position). This position is shown in FIG. 5 in phantom, and in FIG. 6. As shown, the guide 56b may include a key 94 which is configured to ride in a corresponding slot 96 on the housing 22b. Of course, these structures may be reversed in that a slot may be provided on the guide 56b for receiving a corresponding key on the housing 22b. Even further, completely different structure can be employed to provide that the guide 56b can rotate with respect to the housing 22b.

Figure 6:
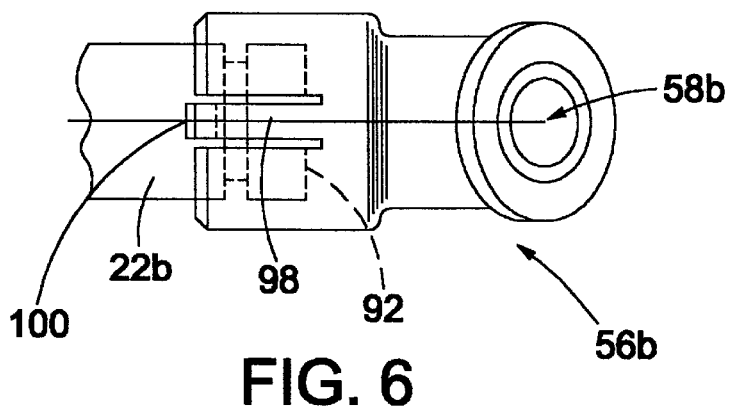
FIG. 6 is a bottom, plan view of a portion of the device illustrated in FIG. 5, showing the guide locked in the disabling position.

Not only is it preferred that the guide 56b be rotatable with respect to the housing 22b so that the guide 56b can be rotated to a position at which it is generally difficult or impossible to insert the driver 34 into the guide 56b, but it is preferred that the guide 56b can be locked into this position so that a typical consumer cannot readily rotate the guide 56b back into a position which makes it relatively easy to insert a driver 34 into the guide 56b. Specifically, as shown in FIG. 6, the guide 56b may include a latch 98 which engages an aperture 100 on the housing 22b when the guide 56b is rotated into the disabling position (shown in phantom in FIG. 5 and in FIG. 6). Still other structure may be utilized to provide that the guide 56b can be locked into position with respect to the housing 22b. Regardless, preferably the guide 56b can be subsequently unlocked from the disabling position by an authorized person, such as an authorized mechanic. For example, with reference to FIG. 6, the latch 98 can be pulled radially outward, away from the housing, to provide that the latch 98 disengages from the aperture 100 on the housing 22b thereby allowing the guide 56b to be rotatable again with respect to the housing 22b.

Preferably, the rotatability of the guide 56b provides that when the guide 56b is not locked into the disabling position, the guide 56b can be rotated to a position which makes it relatively easy for an authorized person to insert the driver 34 into the guide 56b and effect an adjustment to the directing member 26, and therefore adjust the position of the headlamp reflector 30.

It is preferred that the guide 56b be configured Such that the guide 56b, in any position in its rotation, generally hides the second end 32 of the directing member 26 from view thereby making it somewhat difficult for a consumer to predict which type of tool is needed to effect translation of the directing member 26 and an adjustment to the position of the headlamp reflector 30. Preferably, the guide 56b is configured such that a custom adjustment tool 38, such as is illustrated in FIGS. 2 and 3, and as described fully hereinabove, needs to be used to engage the second end 32 of the directing member 26 and adjust the position of the headlamp reflector 30.

Preferably, means for providing a prevailing torque such as shown in FIG. 4 is included in the device 20b shown in FIG. 5 to prevent accidental movement of the directing member 20. As a result, a generally consistent prevailing torque is provided which does not tend to generally decrease with each movement of the directing member 26 relative to the housing 22b. Therefore, the device 20b does not tend to become less reliable with each adjustment.

By providing that the guide 56b can be rotated and locked in a disabling position, that it is relatively difficult to ascertain what type of adjustment tool is needed to effect translation of the directing member 26, and that a custom adjustment tool 38 must be used to adjust the position of the headlamp reflector 30, the device 20b is generally tamper-resistant with respect to a typical consumer.

FIG. 7 illustrates a device 20c which is in accordance with a third and preferred embodiment of the present invention. Like the devices 20a and 20b illustrated in FIGS. 1 and 5, respectively, the device 20c illustrated in FIG. 7 includes a housing 22c which is engageable with a headlamp assembly 24 or to some other suitable fixed Surface, and a directing member 26, such as an adjustor screw or ball screw, which extends from the housing and has a first end 28 which is engageable with a headlamp reflector 30 of the headlamp assembly.

Like the directing members 26 of the devices 20a and 20b illustrated in FIGS. 1 and 5, respectively, the directing member 26 of the device 20c illustrated in FIG. 7 has a second end 32 opposite the first end 28, and the second end 32 is preferably configured to receive a driver 34, such as a multi-lobular driver, e.g. a Torx® bit, or another suitably configured driver, and is configured such that it receives the driver 34 generally coaxial with a longitudinal axis 40 of the directing member 26. Rotation of the driver about an axis 42 which is generally coaxial with the longitudinal axis 40 of the directing member 26 causes the directing member 26 to translate linearly relative to the housing 22c thereby causing an adjustment to the position of the headlamp reflector 30 which is engaged with the first end 28 of the directing member 26. As shown in FIG. 7, threading 44 may be provided on the directing member 26 for engaging a nut 46 which is non-rotatably retained in the housing 22c. Of course, other structure may be provided to cause the directing member 26 to translate relative to the housing 22c upon rotation of the directing member 26.

As with the devices 20a and 20b illustrated in FIGS. 1 and 5, by providing that the directing member 26 is configured to receive the driver 34 generally coaxial with a longitudinal axis 40 of the directing member 26, the device 20c illustrated in FIG. 7 need not include gearing in order to transfer rotation of the driver 34 into linear translation of the directing member 26, which translation in turn effects an adjustment of the position of the headlamp reflector 30. In other words, the device 20c can be gearless, and therefore can be produced at relatively low cost.

Sealing 7 structure 48 may be provided between the housing 22c and the directing member 26 to generally prevent moisture from entering the housing 22c. Additionally, sealing structure 90 may be provided between the headlamp assembly and the housing, for example at the location indicated by reference numeral 54, to generally prevent moisture from entering the headlamp assembly 24 through an aperture 54 in the headlamp assembly 30 and provide an axial force as described hereinabove. For example, the sealing structures may consist of rubber or silicone o-rings. Preferably, the housing 22c is configured to be "quick connect" mounted in the aperture 54.

Proximate the second end 32 of the directing member 26 is a guide 56c which is engaged with an end 10 of the housing 22c. The guide 56c provides a receptacle 58c for receiving the driver 34. As the driver 34 is initially inserted in the receptacle 58c, preferably internal walls 60c of the guide 56c work to guide the driver 34 to the second end 32 of the directing member. This provides that an authorized person attempting to effect an adjustment to the position of the headlamp reflector 30 can do so "blindly" merely by inserting the driver end 36 of a drive tool 38 into the receptacle 58c provided by the guide 56c. As the drivel 34 reaches the second end 32 of the directing member 26, the driver 34 may be pulsed to provide alignment with respect to the second end 32 of the directing member 26 for engagement therewith. Subsequently, the positioning, of the headlamp reflector 30 can be adjusted.

It is preferred that the guide 56c be configured such that it generally hides the second end 32 of the directing member 26 from view thereby making it somewhat difficult for a consumer to predict which type of tool is needed to effect translation of the directing member 26 and an adjustment to the position of the headlamp reflector 30. Preferably, the guide 56c is configured such that a custom adjustment tool 38, Such as is illustrated in FIGS. 2 and 3, and as described fully hereinabove, needs to be used to engage the second end 32 of the directing member 26 and adjust the position of the headlamp reflector 30.

Figure 8:
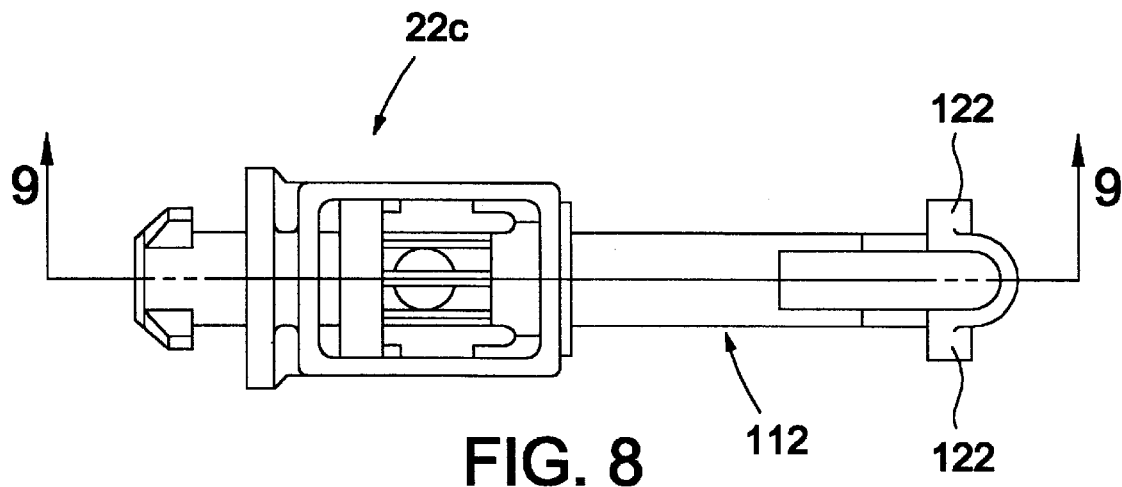
FIG. 8 is a top, plan view of a housing of the device shown in FIG. 7.
Figure 9:
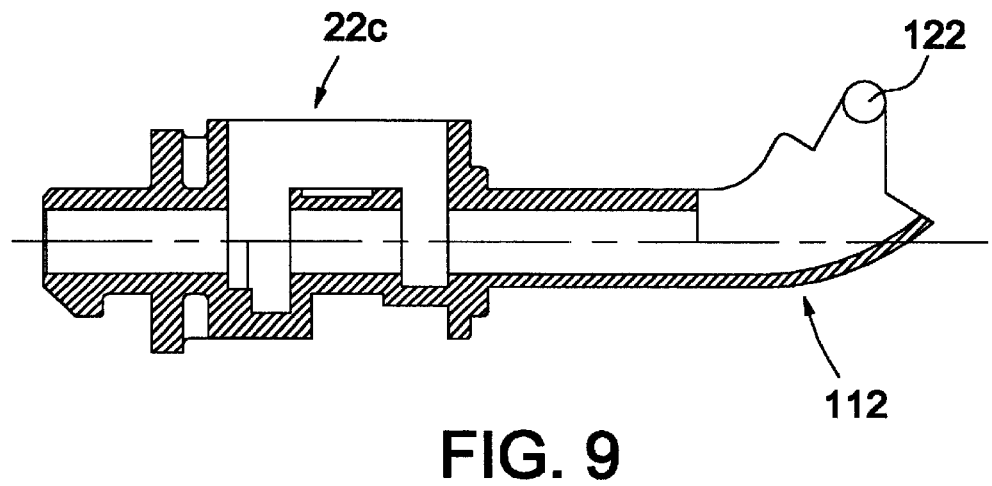
FIG. 9 is a cross-sectional view, taken along line 9—9 of FIG. 8, of the housing illustrated in FIG. 8.

As shown in FIGS. 7–9, the guide 56c may consist of a guide adapter 112 on the end 110 of the housing 22c and a guide tube 114 which is engaged with the guide adapter 112. Preferably, the guide tube 114 is mounted to a housing of the headlamp assembly or another suitable support Structure 120. As shown, the guide adapter 112 may include two flanges 122 which engage in corresponding slots 124 (see FIG. 7) in the guide tube 114 such that the guide tube 114 can be "snapped" onto the guide adapter 112. The guide adapter 112 may form a part of the housing 22c itself, or may consist of a separate piece which is attached or otherwise engaged with the end 10 of the housing 22c. As shown in FIG. 7, the guide adapter 112 and guide tube 114 provide that the driver 34 can be inserted into the guide tube 114, and the guide tube 114 and subsequently the guide adapter 112, guide the driver 34 into engagement with the second end 32 of the directing member 26.

Figure 10:
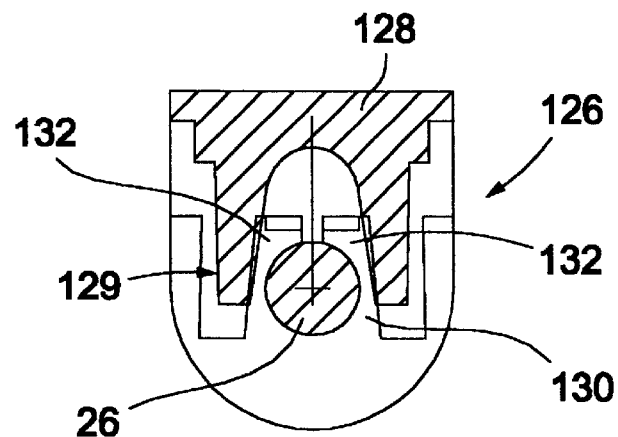
FIG. 10 is a cross-sectional view, taken along line 10—10 of FIG. 7, of the device illustrated in FIG. 7, showing structure which provides a prevailing torque on the directing member of the device.

Preferably, means for providing a prevailing torque Such as shown in FIG. 4 is included in the device shown in FIG. 7 to prevent accidental movement of the directing member. FIG. 10 illustrates possible structure 126 which can be employed, and this structure 126 is very similar to that which is shown in FIG. 4 including a housing cover 128, a spring yoke 129, a torque block 130 and two arms 132, and functions in much the same way. As a result of employing such a means for providing a prevailing torque, a generally consistent prevailing torque is provided which does not tend to generally decrease with each movement of the directing member 26 relative to the housing 22c. Therefore, the device 20c does not tend to become less reliable with each adjustment.

By providing that it is relatively difficult to ascertain what type of adjustment tool is needed to effect translation of the directing member 26, and by requiring that a Custom adjustment tool 38 must be used to adjust the position of the headlamp reflector 30, the device 20c is generally tamper-resistant with respect to a typical consumer.

While embodiments of the present invention arc shown and described, it is envisioned that those skilled in the art may devise various modifications of the present invention without departing from the spirit and scope of the foregoing disclosure. Therefore, the invention is not intended to be limited by the foregoing disclosure.

What is claimed is:

1. A headlamp adjuster for adjusting a position of a headlamp reflector of a headlamp assembly, said device comprising: a housing; a directing member which generally extends from the housing, said directing member having a first end which is engageable with the headlamp reflector of the headlamp assembly and having a second end which is generally opposite the first end, said headlamp adjuster configured to receive a driver such that rotation of the driver causes the directing member to translate relative to the housing thereby causing adjustment of the position of the headlamp reflector which is engaged with the first end of the directing member; a spring yoke in the housing; and a torque block in the housing, said spring yoke configured to engage and deflect said torque block toward the directing member.

2. A headlamp adjuster for adjusting a position of a headlamp reflector of a headlamp assembly, said device comprising: a housing; and a directing member which generally extends from the housing, said directing member having a first end which is engageable with the headlamp reflector of the headlamp assembly and having a second end which is generally opposite the first end, said headlamp adjuster configured to receive a driver generally coaxial with a longitudinal axis of the directing member, said headlamp adjuster configured such that rotation of the driver about an axis which is generally coaxial with the longitudinal axis of the directing member causes the directing member to translate relative to the housing thereby causing adjustment of the position of the headlamp reflector which is engaged with the first end of the directing member, further comprising a spring yoke in the housing and a torque block in the housing, said spring yoke configured to engage and deflect said torque block toward the directing member.

3. The headlamp adjuster as recited in claim 2, further comprising a guide on the housing configured for receiving and guiding the driver to the second end of the directing member.

4. The headlamp adjuster as recited in claim 3, wherein the guide is configured such that the guide generally hides the second end of the directing member from view.

5. The headlamp adjuster as recited in claim 3, wherein the guide is configured such that a tool with a flexible shaft with the driver at an end of the flexible shaft needs to be used to engage the second end of the directing member and adjust the position of the headlamp reflector.

6. The headlamp adjuster as recited in claim 3, wherein the guide is rotatable with respect to the housing.

7. The headlamp adjuster as recited in claim 6, wherein the guide and the housing are configured such that the guide can be releasably locked in a disabling position.

8. The headlamp adjuster as recited in claim 3, wherein the guide is rotatable to a position which generally bides the second end of the directing member from view.

9. The headlamp adjuster as recited in claim 6, wherein the guide is configured such that a tool with a flexible shaft with the driver at an end of the flexible shaft needs to be used to engage the second end of the directing member and adjust the position of the headlamp reflector.

10. The headlamp adjuster as recited in claim 3, wherein the guide comprises a guide tube which is engaged with a guide adapter on an end of the housing.

11. The headlamp adjuster as recited in claim 10, wherein the guide tube and guide adapter are configured such that the second end of the directing member is generally hidden from view.

12. The headlamp adjuster as recited in claim 11, wherein the guide tube and guide adapter are configured such that a tool with a flexible shaft with the driver at an end of the flexible shaft needs to be used to engage the second end of the directing member and adjust the position of the headlamp reflector.

13. The headlamp adjuster as recited in claim 2, further comprising a generally non-movable, non-pivotable, guide tube which is configured for receiving and guiding the driver to the second end of the directing member.

14. A headlamp adjuster for adjusting a position of a headlamp reflector of a headlamp assembly, said device comprising: a housing; and a directing member which generally extends from the housing, said directing member having a first end which is engageable with the headlamp reflector of the headlamp assembly and having a second end which is generally opposite the first end, said headlamp adjuster configured to receive a driver generally coaxial with a longitudinal axis of the directing member, said headlamp adjuster configured such that rotation of the driver about an axis which is generally coaxial with the longitudinal axis of the directing member causes the directing member to translate relative to the housing thereby causing adjustment of the position of the headlamp reflector which is engaged with the first end of the directing member, further comprising a guide on the housing configured for receiving and guiding the driver to the second end of the directing member wherein the guide comprises a guide tube which is engaged with a guide adapter on an end of the housing wherein the guide tube and guide adapter are configured such that a tool with a flexible shaft with the driver at an end of the flexible shaft needs to be used to engage the second end of the directing member and adjust the position of the headlamp reflector.

15. The headlamp adjuster as recited in claim 14, further comprising a spring yoke in the housing and a torque block in the housing, said spring yoke configured to engage and deflect said torque block toward the directing member.

16. The headlamp adjuster as recited in claim 14, wherein the guide is configured such that the guide generally hides the second end of the directing member from view.

17. The headlamp adjuster as recited in claim 14, wherein the guide is configured such that a tool with a flexible shaft with the driver at an end of the flexible shaft needs to be used to engage the second end of the directing member and adjust the position of the headlamp reflector.

18. The headlamp adjuster as recited in claim 14, wherein the guide is rotatable with respect to the housing.

19. The headlamp adjuster as recited in claim 18, further comprising a spring yoke in the housing and a torque block in the housing, said spring yoke configured to engage and deflect said torque block toward the directing member.

20. The headlamp adjuster as recited in claim 18, wherein the guide and the housing are configured such that the guide can be releasably locked in a disabling position.

21. The headlamp adjuster as recited in claim 20, further comprising a spring yoke in the housing and a torque block in the housing, said spring yoke configured to engage and deflect said torque block toward the directing member.

22. The headlamp adjuster as recited in claim 18, wherein the guide is rotatable to a position which generally hides the second end of the directing member from view.

23. The headlamp adjuster as recited in claim 18, wherein the guide is configured such that a tool with a flexible shaft with the driver at an end of the flexible shaft needs to be used to engage the second end of the directing member and adjust the position of the headlamp reflector.

24. The headlamp adjuster as recited in claim 14, further comprising a spring yoke in the housing and a torque block in the housing, said spring yoke configured to engage and deflect said torque block toward the directing member.

25. The headlamp adjuster as recited in claim 14, wherein the guide tube and guide adapter are configured such that the second end of the directing member is generally hidden from view.

26. A headlamp adjuster for adjusting a position of a headlamp reflector of a headlamp assembly, said device comprising: a housing; and a directing member which generally extends from the housing, said directing member having a first end which is engageable with the headlamp reflector of the headlamp assembly and having a second end which is generally opposite the first end, said headlamp adjuster configured to receive a driver, said headlamp adjuster configured such that rotation of the driver causes the directing member to translate relative to the housing thereby causing adjustment of the position of the headlamp reflector which is engaged with the first end of the directing member, further comprising a spring yoke in the housing and a torque block in the housing, said spring yoke configured to engage and deflect said torque block toward the directing member.

27. The headlamp adjuster as recited in claim 26, further comprising a guide on the housing configured for receiving and guiding the driver to the second end of the directing member.

28. The headlamp adjuster as recited in claim 27, wherein the guide is configured such that the guide generally hides the second end of the directing member from view.

29. The headlamp adjuster as recited in claim 27, wherein the guide is configured such that a tool with a flexible shaft with the driver at an end of the flexible shaft needs to be used to engage the second end of the directing member and adjust the position of the headlamp reflector.

30. The headlamp adjuster as recited in claim 27, wherein the guide is rotatable with respect to the housing.

31. The headlamp adjuster as recited in claim 30, further comprising a spring yoke in the housing and a torque block in the housing, said spring yoke configured to engage and deflect said torque block toward the directing member.

32. The headlamp adjuster as recited in claim 30, wherein the guide and the housing are configured such that the guide can be releasably locked in a disabling position.

33. The headlamp adjuster as recited in claim 32, further comprising a spring yoke in the housing and a torque block in the housing, said spring yoke configured to engage and deflect said torque block toward the directing member.

34. The headlamp adjuster as recited in claim 30, wherein the guide is rotatable to a position which generally hides the second end of the directing member from view.

35. The headlamp adjuster as recited in claim 30, wherein the guide is configured such that a tool with a flexible shaft with the driver at an end of the flexible shaft needs to be used to engage the second end of the directing member and adjust the position of the headlamp reflector.

36. The headlamp adjuster as recited in claim 27, wherein the guide comprises a guide tube which is engaged with a guide adapter on an end of the housing.

37. The headlamp adjuster as recited in claim 36, further comprising a spring yoke in the housing and a torque block in the housing, said spring yoke configured to engage and deflect said torque block toward the directing member.

38. The headlamp adjuster as recited in claim 36, wherein the guide tube and guide adapter are configured such that the second end of the directing member is generally hidden from view.

39. The headlamp adjuster as recited in claim 36, wherein the guide tube and guide adapter are configured such that a tool with a flexible shaft with the driver at an end of the flexible shaft needs to be used to engage the second end of the directing member and adjust the position of the headlamp reflector.

40. A headlamp adjuster for adjusting a position of a headlamp reflector of a headlamp assembly, said device comprising: a housing; and a directing member which generally extends from the housings said directing member having a first end which is engageable with the headlamp reflector of the headlamp assembly and having a second end which is generally opposite the first end, said headlamp adjuster configured to receive a driver, said headlamp adjuster configured such that rotation of the driver causes the directing member to translate relative to the housing thereby causing adjustment of the position of the headlamp reflector which is engaged with the first end of the directing member, further comprising a tapered guide tube proximate the second end of the directing member, said tapered guide tube configured for receiving and guiding the driver to the second end of the directing member and including an enlarged opening at an end thereof for initially receiving the driver.

* * * * *

UNITED STATES PATENT AND TRADEMARK OFFICE
CERTIFICATE OF CORRECTION

PATENT NO.    : 6,338,567 B1
DATED         : January 15, 2002
INVENTOR(S)   : Ronald S. Denley It is certified that error appears in the above-identified patent and that said Letters Patent is hereby corrected as shown below:

<u>Title page,</u>
ABSTRACT, Line 15, "direction" should be -- directing --

<u>Column 11,</u>
Line 11, "Sealing 7" should be -- Sealing --
Line 31, "drivel" should be -- driver --

<u>Column 13,</u>
Line 9, "bides" should be -- hides --

Signed and Sealed this

Twenty-first Day of May, 2002

*Attest:*

*Attesting Officer*

JAMES E. ROGAN
*Director of the United States Patent and Trademark Office*